May 26, 1936.  C. D. SMITH  2,042,029
RAIL WIPER
Filed Oct. 19, 1932
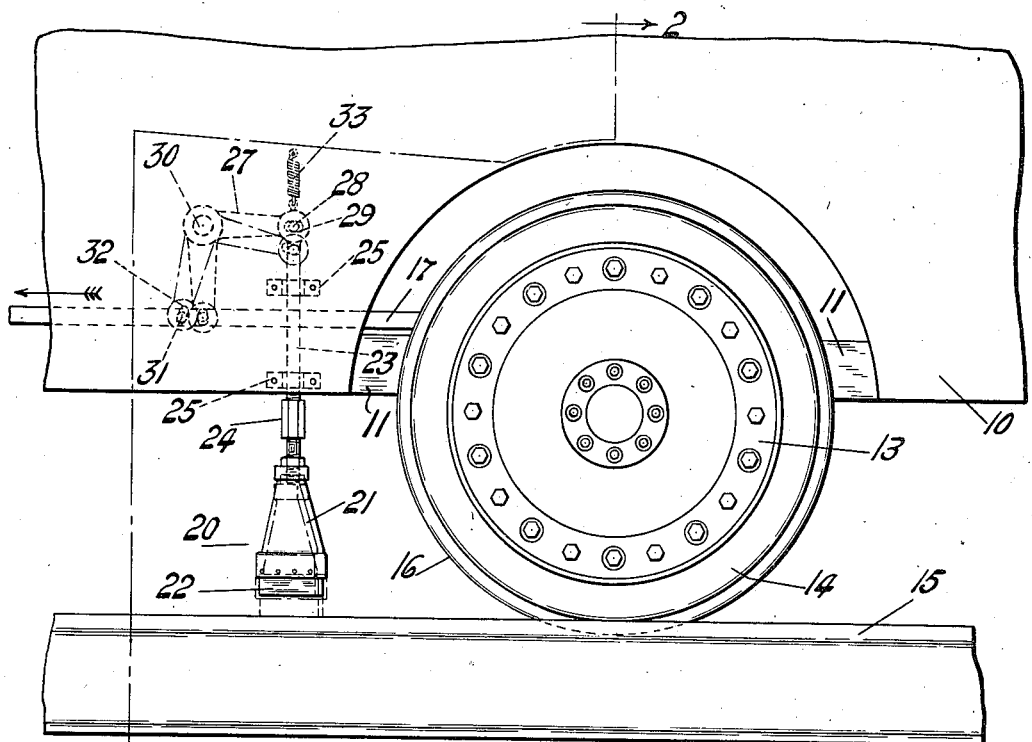
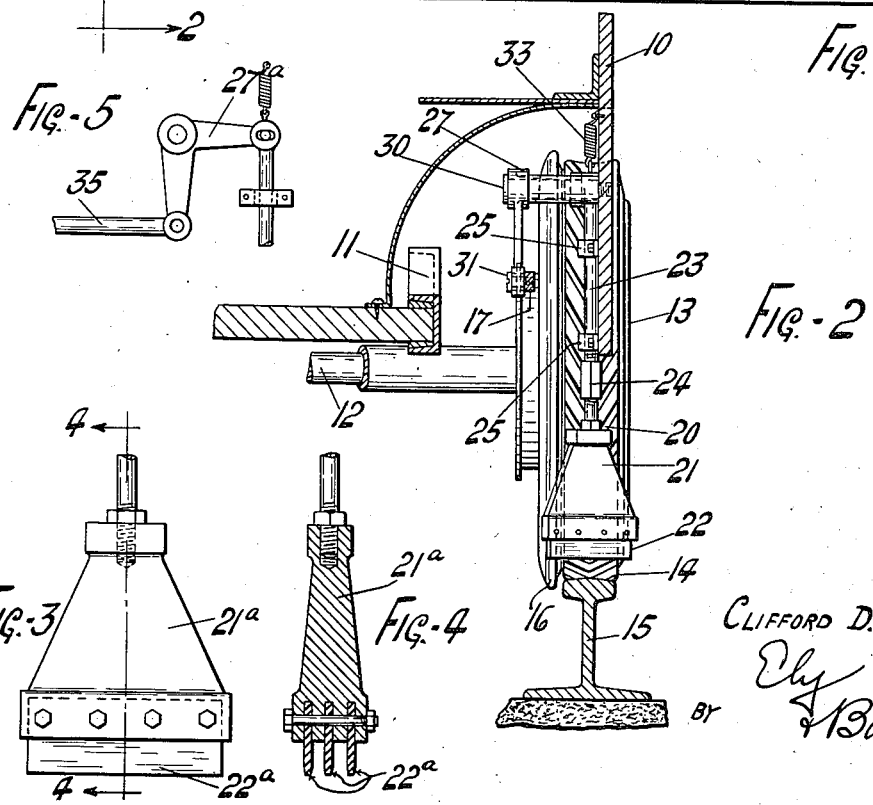
CLIFFORD D. SMITH, INVENTOR
BY Barrow
ATTORNEYS Patented May 26, 1936

2,042,029

UNITED STATES PATENT OFFICE 2,042,029

RAIL WIPER

Clifford D. Smith, Fairlawn, Ohio, assignor to The Firestone Tire & Rubber Company, Akron, Ohio, a corporation of Ohio Application October 19, 1932, Serial No. 638,459

3 Claims. (Cl. 104—279)

This invention relates to rail wipers, and more especially it relates to devices for removing moisture, such as dew or rain water from the track rails.

The device is of primary utility when used in combination with coaches or vehicles equipped with rubber tires that are constructed to travel upon railway or street car tracks, the device being adapted to remove moisture from the rails ahead of the rubber tires so as to improve the traction between tires and rails during starting and stopping of the vehicle.

The chief object of the invention is to provide an improved rail wiper for the purpose mentioned. Another object is to increase the safety of rail-coaches mounted upon rubber tires. A further object is to provide for automatic operation of the rail wiper during a braking operation.

Of the accompanying drawing:

Figure 1 is a side elevation of the rail wiper, in its preferred form, and a portion of a rubber-tired rail coach upon which it is mounted;

Figure 2 is a section on the line 2—2 of Figure 1;

Figure 3 is an elevation of a modified form of the rail wiper;

Figure 4 is a section on the line 4—4 of Figure 3; and

Figure 5 is a fragmentary side elevation of mechanism for operating the rail wiper independently of the wheel brake.

Referring to the drawing, 10 is a portion of the body of a rail coach of which 11 is the frame thereof, and 12 is an axle upon which is mounted a wheel 13 equipped with a rubber tire 14 of the pneumatic type, the latter suitably constructed for travel upon a track rail 15. The inner side of the wheel 13 carries a flange 16 for limiting lateral movement of the tire 14 with relation to the rail 15, the said wheel also being provided with the usual brake drum and brake (not shown), the brake being operated by means of the longitudinally movable brake rod 17.

The rail wiper constituting this invention is generally designated 20, and normally is positioned in front of the wheel 13. It comprises a body portion or holder 21 having a flexible blade or strip of rubber 22 removably mounted in its lower marginal portion and projecting downwardly therefrom. The holder 21 is mounted upon the lower end of a vertical stem or support rod 23 that preferably is made in two parts and provided with a turnbuckle device 24 by means of which the normal elevation of the wiper 20 with relation to the rail 15 may be adjusted.

The rod 23 is slidably mounted in two or more brackets 25, 25 that are mounted upon the coach body 10, and if desired the rod may be square in section to prevent angular movement in said brackets, or any other suitable means may be provided for accomplishing the same result. Preferably the wiper 20 is so disposed that the rubber strip 22 thereof is oblique with relation to the track rail 15, as shown, whereby removal of water from the rail is facilitated.

The upper end of the rod 23 is pivotally connected to one arm of a bell crank 27, as by means of a pin 28 on the rod that extends into a lost-motion slot 29 in the bell crank. The bell crank 27 is pivotally mounted at 30 on the coach body, and has a downwardly extending arm that has a pivotal connection with the brake rod 17 comprising a stud 31 on the brake rod that extends through a slot 32 in the bell crank arm.

A tension spring 33 is connected to the arm of the bell crank 27 that includes the pivotal connection 28, 29, and to the coach body 10, the arrangement being such as normally to hold the rod 23 in raised position whereby the wiper 20 is supported clear of the rail track 15.

In the operation of the apparatus, movement of the brake rod 17 to the left, as indicated by the arrow in Figure 1, will apply the brake to wheel 13 and concurrently move the bell crank 27, against the tension of spring 33 to the broken line position shown whereby the rod 23 is lowered and the rubber wiper blade 22 brought into contact with the track rail 15, to remove moisture or water therefrom in the manner of a squeegee. In this manner the vehicle can be quickly brought to a stop on wet rails because the tires do not slip or slide on dry rails.

In the modified construction shown in Figures 3 and 4, the rail wiper comprises a holder 21ª in which are removably mounted a plurality of flexible rubber blades 22ª, 22ª.

In the modified arrangement shown in Figure 5, the bell crank 27ª is connected to an operating rod 35 that has its own operating means (not shown) independent of the brake operating mechanism. This construction is advantageous in that in starting the vehicle the moisture may be removed from the rails without applying the brakes to the vehicle. Thus the independently operated wipers should be used in association with the front wheels of a vehicle, and the brake-operated type may be used with the rear wheels.

Although the rail wiper is shown in position in front of a wheel, it will be obvious that similar wipers may be mounted behind the wheel for wiping the rail before backing the vehicle.

The rail wiper is simple in construction and efficient in operation and achieves the several advantages set out in the foregoing statement of objects.

Other modifications may be resorted to without departing from the spirit of the invention or scope thereof as defined by the appended claims.

What is claimed is:

1. The combination which comprises a vehicle, a rubber-tired wheel thereon adapted for travel upon a track rail, brake mechanism for said wheel, means including a flexible wiper blade carried by the vehicle and constructed and arranged to be brought into wiping engagement with said track rail for removing moisture from the rail in advance of the wheel tire, and means for operating said moisture-removing means concurrently with the operation of the brake mechanism.

2. The combination which comprises a vehicle, a rubber-tired wheel thereon adapted for travel on a track rail, a wiper including a flexible rubber blade disposed obliquely with relation to the track rail, said wiper being mounted adjacent the wheel in position to engage the track rail in advance of said wheel, and means for moving said wiper into wiping engagement with the rail, whereby moisture may be removed from said track rail to prevent or decrease the slippage of said rubber-tired wheel thereon.

3. The combination which comprises a vehicle, a rubber-tired wheel thereon adapted for travel upon a track rail, brake-mechanism for said wheel including a brake operating rod, a squeegee disposed adjacent the wheel above the track rail, a vertically movable support rod for the squeegee, yielding means normally urging said rod upwardly to hold the squeegee off the rail, and means connecting the support rod to the brake-operating rod for lowering the squeegee and urging it into contact with the rail.

CLIFFORD D. SMITH.